United States Patent
Kodali et al.

(10) Patent No.: US 11,016,807 B2
(45) Date of Patent: May 25, 2021

(54) INTERMEDIARY SYSTEM FOR DATA STREAMS

(71) Applicant: Target Brands, Inc., Minneapolis, MN (US)

(72) Inventors: Kiran Kumar Kodali, Plymouth, MN (US); Aruna Subba Rao, Maple Grove, MN (US); Ragesh Gopan Gopakumaran Nair Remadeviamma, Edina, MN (US)

(73) Assignee: Target Brands, Inc., Minneapolis, MN (US)

( * ) Notice: Subject to any disclaimer, the term of this patent is extended or adjusted under 35 U.S.C. 154(b) by 91 days.

(21) Appl. No.: 16/444,798

(22) Filed: Jun. 18, 2019

(65) Prior Publication Data

US 2020/0401446 A1    Dec. 24, 2020

(51) Int. Cl.
  *G06F 9/46* (2006.01)
  *G06F 9/48* (2006.01)

(52) U.S. Cl.
  CPC .................. *G06F 9/4887* (2013.01)

(58) Field of Classification Search
  None
  See application file for complete search history.

(56) References Cited

U.S. PATENT DOCUMENTS

| | | | |
|---|---|---|---|
| 8,355,982 B2 | 1/2013 | Hazel et al. | |
| 9,741,051 B2 | 8/2017 | Carpenter et al. | |
| 10,037,526 B2 | 7/2018 | Campos | |
| 10,129,263 B2 | 11/2018 | Thomas et al. | |
| 2015/0032625 A1 | 1/2015 | Dill et al. | |
| 2015/0317613 A1 | 11/2015 | Clark | |
| 2016/0267480 A1 | 9/2016 | Metral | |
| 2017/0132627 A1 | 5/2017 | Phillips et al. | |
| 2017/0161701 A1 | 6/2017 | Amancherla | |
| 2017/0213204 A1 | 7/2017 | Massoudi et al. | |

FOREIGN PATENT DOCUMENTS

WO    2017160877 A1    9/2017

OTHER PUBLICATIONS

Pezold, Tokenex, Okenizing with your payment service provided? Think again Part 1 of 2, https://tokenex.com/tokenizing-with-your-payment-service-provider-think-again-part-1-of-2/, 6 pages, Aug. 30, 2017.

*Primary Examiner* — Gregory A Kessler
(74) *Attorney, Agent, or Firm* — Theodore M. Magee; Westman, Champlin & Koehler, P.A.

(57) ABSTRACT

A computer-implemented method include sending a first cycle of received event data to an external system for processing and while waiting for the external system to confirm that processing of the first cycle of received event data has been completed, receiving a stream of additional event data for processing and assigning some of the additional event data to a second cycle of received event data, wherein the second cycle has a scheduled transmission time to be sent to the external system for processing. The second cycle of received event data is prevented from being sent to the external system when the scheduled transmission time arrives because the external system has not returned confirmation that processing has been completed for the first cycle.

13 Claims, 6 Drawing Sheets

INTERMEDIARY SYSTEM FOR DATA STREAMS

BACKGROUND

In some computer architectures, data streams created by multiple sources are sent to an intermediary system where the data within the data streams is collated and redistributed to other systems for further processing. In large scale systems with huge amounts of data, the data streams can overwhelm the intermediary system causing an interruption in processing and in severe cases loss of data.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method include sending a first cycle of received event data to an external system for processing and while waiting for the external system to confirm that processing of the first cycle of received event data has been completed, receiving a stream of additional event data for processing and assigning some of the additional event data to a second cycle of received event data, wherein the second cycle has a scheduled transmission time to be sent to the external system for processing. The second cycle of received event data is prevented from being sent to the external system when the scheduled transmission time arrives because the external system has not returned confirmation that processing has been completed for the first cycle.

A system includes an input stream processor and a cycle processor. The input stream processor receives a stream of event data messages and stores the event data of each message to indicate that the event data has been assigned to a respective cycle of a respective external processing system. The cycle processor controls the execution of cycles for a plurality of external processing systems such that event data assigned to a cycle are prevented from being sent to an external processing system associated with the cycle at a time scheduled for transmission of the cycle when the external processing system has yet to return confirmation of processing event data in a previous cycle.

A method includes receiving event data and assigning the event data to a cycle that has a scheduled time for sending the event data to an external processor for processing. Further event data is received after the scheduled time and is assigned to a second cycle for the external processor while preventing the event data assigned to the cycle from being sent to the external processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The embodiments described below provide intermediary systems that collate and redistribute streams of data so that the data can be sent to external processors for further processing and so that the results of that further processing can be monitored. The streams of data consist of individual data packets where each packet represent a discrete event. The attributes of the event data determine which of a plurality of external processors should receive the event data for further processing.

The intermediary system is designed to continue to accept the streams of data without data loss even when one or more external processors cease processing the event data. To do this, the intermediary system defines one or more cycles for each external processer. Each cycle has an associated scheduled transmission time when a batch of event data is to be sent to the cycle's external processer. The batch of event data for a cycle is formed by assigning event data to the cycle as the event data is received.

If the external processor is unable to process a previous cycle's batch of data before the next cycle's scheduled transmission time, the next cycle is held until such time that the external processor returns confirmation that processing of the previous cycle is complete. Only then does the server release the current cycle's data to the external processor. While waiting for the external processor to return the confirmation file, new event data is stored for subsequent cycles. As a result, the intermediary system does not continue to fill one cycle with incoming data while waiting for the external processor but instead switches between cycles at each scheduled transmission time. This prevents the cycle data from growing too large while continuing to allow the intermediary system to accept new event data even though the external processor is not processing data as expected.

Figure 1:
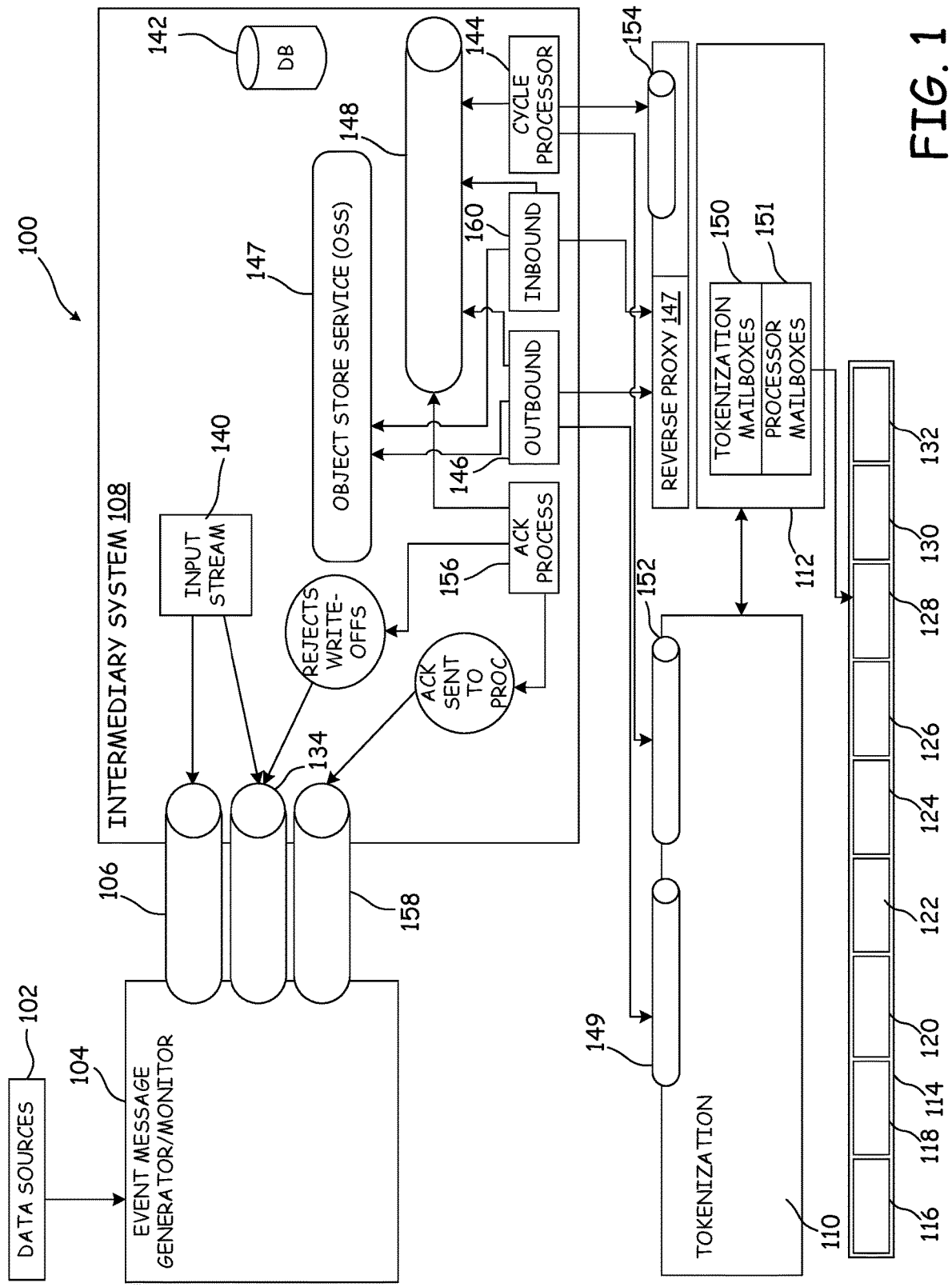
FIG. 1 is a block diagram of a processing system in accordance with one embodiment.

FIG. 1 provides a block diagram of system 100 for managing data streams so that individual events within the data stream can be processed by external processors. In FIG. 1 data sources 102 provide a stream of data related to individual events. The stream of data includes individual-event packets each containing data for a single event and/or multiple-event packets containing data for multiple events. Examples of event data includes data related to movement of products in a distribution chain, and sales transactions that occur either at a store or on-line, for example.

The data stream from data sources 102 is provided to an event message generator 104, which generates a separate message for each event. Each message indicates an external processor that is to be used to process the event data as well as information needed by the external processor to correctly process the event. When event message generator 104 receives a multi-event packet from data sources 102, it parses the multi-event packet into individual event messages with one message for each event listed in the packet. Event message generator 104 provides each event message to a message broker 106, which holds the message until it is requested by an intermediary system 108. Intermediary system 108 collates the event messages by assigning each event message to a cycle for an external processor.

In accordance with one embodiment, each event message contains tokens that represent confidential information without disclosing the confidential information. To avoid having to design intermediary system 108 to withstand efforts to access the confidential information, system 100 uses a tokenization system 110 that is external to intermediary system 108 to convert the tokens into the confidential information that the tokens represent. Once the tokens have been replaced with the confidential information, the resulting file containing the data of every event assigned to the cycle is passed through a communication portal 112 to one of the external processors/systems 114. External processors 114 include a plurality of external processors 116, 118, 120, 122, 124, 126, 128, 130 and 132, for example.

External processors 114 process the data for each event in the cycle file and return a confirmation file that, at a minimum, indicates whether processing for each event in the file was successful. This confirmation file is routed through communication portal 112 and any confidential information in the confirmation file is tokenized by tokenization system 110. The tokenized confirmation file is then accessed by intermediary system 108 and messages are generated for at least each event that was not successfully processed. These rejection messages are then provided to a message broker 134, which holds the messages until they are requested by event message generator 104.

The operation of intermediary system 108 is described in more detail below beginning with the flow diagram of FIG. 2. In step 200 of FIG. 2, an input stream processor 140 pulls the event messages from message broker 106 that were sent to message broker 106 by event message generator 104. In accordance with one embodiment, input stream processor 140 is implemented on one or more clusters of virtual machines, such that multiple instances of input stream processor 140 are executing at the same time. In addition, the rate at which input stream processor 140 removes event messages from message broker 106 can be monitored relative to the rate at which event message generator 104 is placing messages on message broker and additional instances of input stream processor 140 can be started when input stream processor 140 is not keeping up with event message generator 104.

For each message pulled from the message broker, input stream processor 140 parses the content of the message and identifies an external processor from the message content at step 202 At step 204, required information from the message is stored in a database 142 so that it is associated with a current cycle for the identified external processor. The current cycle for an external processor is kept in memory in input stream processor 140. The required information is configurable for each external processor and can be provided in database 142, a configuration file (not shown) or within the coding of input stream processor 140.

Figure 2:
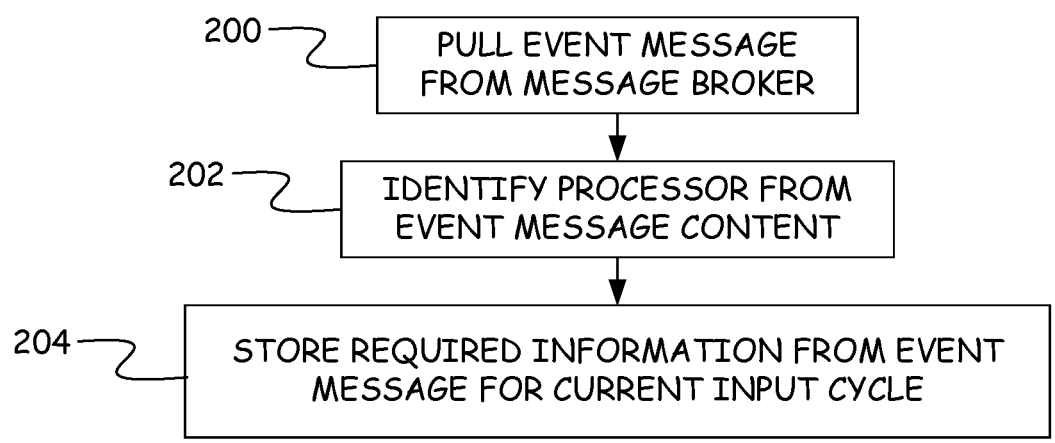
FIG. 2 is a flow diagram of a method of receiving a transaction.

The processing of FIG. 2 is independent of the success or failure of the external processor. As such, input stream processor 140 will continue to accept and store messages as they are placed on message broker 106 even when the external processor has failed to execute previous cycles. This prevents event message data from being lost and provides the opportunity for the external processor to catch up once the external processor has recovered.

Figure 3:
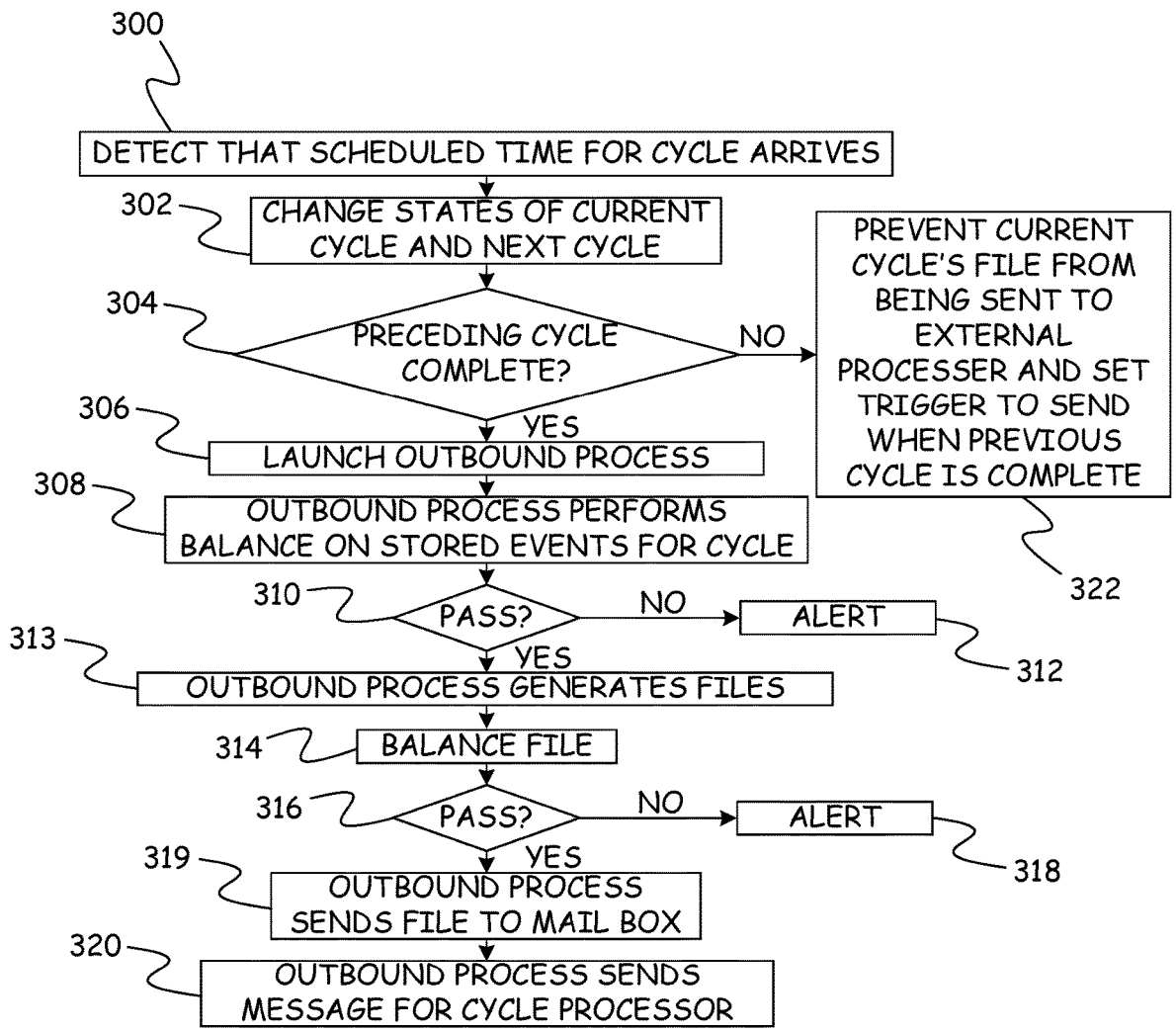
FIG. 3 is a flow diagram of a method performed when a scheduled transmission time for a cycle arrives.

FIG. 3 provides a method that is executed when a scheduled transmission time for a cycle arrives. At step 300 of FIG. 3, cycle processor 144 detects that a scheduled transmission time for a cycle has arrived. This scheduled transmission time is for a particular cycle for a particular external processor. In accordance with one embodiment, cycle processor 144 detects that a scheduled transmission time has arrived using an inbuilt programmatic schedular that keeps track of every cycle's transmission time and that triggers an event each time a cycle's transmission time arrives. For reference below, the cycle that has reached its scheduled transmission time is referred to as the current cycle, the cycle that reached its scheduled transmission time before the current cycle is referred to as the preceding cycle and the cycle with the next scheduled transmission time is referred to as the next cycle.

At step 302, cycle processor 144 changes the state of the current cycle from "receiving input" to "pending transmission" and changes the state of the next cycle from "inactive" to "receiving input". In response to these changes in the cycle states, input stream processor 140 begins storing event data in the next cycle and stop storing event data in the current cycle.

At step 304, cycle processor 144 examines the state of the preceding cycle to determine if the external processor has returned conformation that the event data of the preceding cycle has been processed. If confirmation has been received that the event data of the preceding cycle was processed at step 304, cycle processor 144 launches outbound process 146 at step 306. At step 308, outbound process 146 performs a balancing function on the current cycle's event data stored in database 142 to determine if the stored event data has been corrupted. For example, such balancing can include summing values for different events and comparing the sum to a sum that was produced when the data was stored in database 142.

If the stored data does not pass the balancing test at step 310, an alert is sent at 312. If the stored data does pass the balancing test, outbound process 146 generates a file from the data in database 142 at step 313. After generating the file, outbound process 146 balances the file to ensure that the data placed in the file is not corrupted. If the data does not pass the balancing test at step 316, an alert is sent at step 318. If the data does pass the balancing test at step 316, outbound process 146 stores a copy of the file in object store service 147 and sends the file to an external mailbox 150 through a reverse proxy 147 at step 319. In accordance with one embodiment, the file is sent through a file transfer protocol. At step 320, outbound process 146 sends a message to message broker 148 to be read by cycle processor 144 indicating that the cycle file has been stored in mailbox 150.

Returning to step 304, if conformation has not been received that the preceding cycle was processed, either the file for the preceding cycle has not been sent to the external processor yet or the external processor is still working to process the preceding cycle. In order to avoid overwhelming the external processor with additional data, cycle processor 144 prevents the event data for the current cycle from being sent to the external processor at step 322. Instead, cycle processor 144 sets a trigger to send the current cycle's event data file when the external process returns confirmation that processing has been completed for the preceding cycle.

When an external processor is operating slowly or not at all, it is possible for multiple cycles to be pending for the external processor. In other words, multiple cycles for a same external processor can reach their respective transmission times but have their event data be prevented from being sent to the external processor because confirmation for an earlier cycle has not been received. For example, if confirmation for a first cycle has not been received, event data for a second cycle immediately following the first cycle will be prevented from being sent to the external processor because of the lack of confirmation for the first cycle and event data for a third cycle immediately following the second cycle will be prevented from being sent to the external processor because confirmation of processing for the second cycle has not been received. Once the confirmation for the first cycle is received, the event data for the second cycle will be sent to the external processor but the event data for the third cycle will still be prevented from being sent to the external processor because confirmation of processing for the second cycle has not been received yet.

Note that event data is only prevented from being sent to an external processor if that external processor has not returned confirmation of processing for an earlier cycle. While event data is being prevented from being transmitted to such an external processor, event data for other external processor will continue to be sent. For example, if a cycle's event data is prevented from being sent to a first external processor because the first external processor has not returned conformation of processing a preceding cycle's event data, intermediary system 108 will transmit event data to a second external processor when a cycle for the second external processor reaches its scheduled transmission time. This isolates the external processors from each other such that poor performance of one external processor will not affect the processing of event data by a different external processor.

Figure 4:
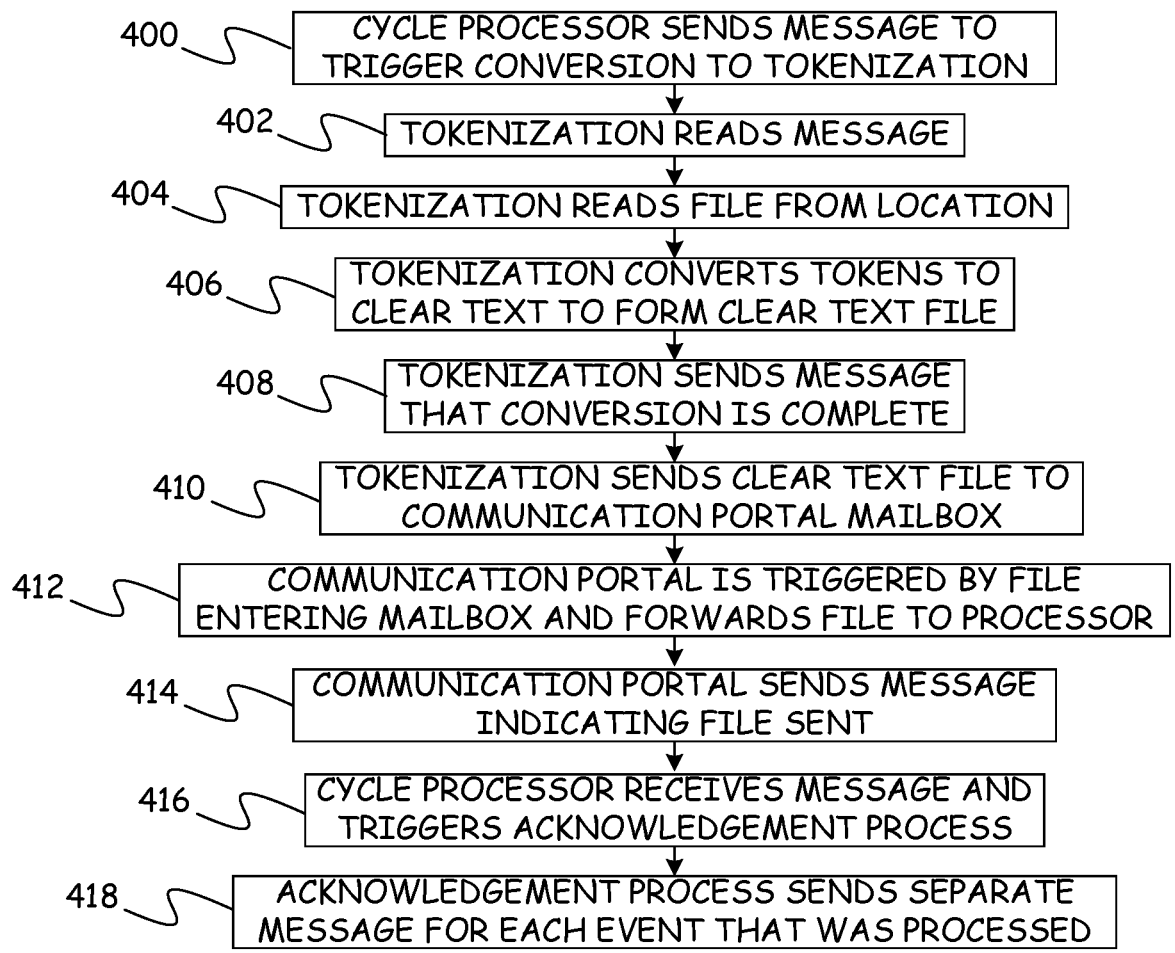
FIG. 4 is flow diagram of a method for transferring an event file to an external processor for processing.

FIG. 4 provides a flow diagram of a method of sending a cycle file to one of the external processors 114. At step 400, cycle processor 144 sends a message to message broker 149 to trigger conversion of tokens in the cycle file to clear text. At step 402, tokenization system 110 reads the message from message broker 148 and in response, at step 404, reads the cycle file stored in tokenization mailbox 150. At step 406, tokenization system 110 converts tokens in the cycle file to clear text to form a clear text file. At step 408, tokenization system 110 posts a message to message broker 152 that indicates that the conversion is complete.

At step 410, tokenization system 110 sends the clear text file to a processor mailbox 151 in communication portal 112. In accordance with one embodiment, the mailbox is dedicated to the external processor for the cycle file. At step 412, the communication portal 112 is triggered by the file entering mailbox 151 and in response, communication portal 112 forwards the file to the appropriate external processor of external processors 114.

At step 414, communication portal 112 sends a message to a message broker 154 indicating that the file has been sent to the external processor. At step 416, cycle processor 144 reads the message from message broker 154 and in response sends a message to message broker 148 that is read by acknowledgement process 156. At step 418, based on the message from cycle processor 144, acknowledgement process 156 sends a separate message for each event in the cycle file indicating that the event was processed. In accordance with one embodiment, the messages are posted to a message broker 158 such that they can be retrieved by event message generator 104. In accordance with one embodiment, acknowledgement process 156 is executed on a cluster such that parallel instances of the acknowledgement process can be executed to divide up the workload of sending a separate message for each event in the cycle file. Note that the acknowledgements are sent even though the events have yet to be processed. Sending these messages while the events are being processed speeds up the system without impacting reliability since the vast majority of events will be processed correctly. Should an event not be processed correctly, a later rejection message is sent.

Figure 5:
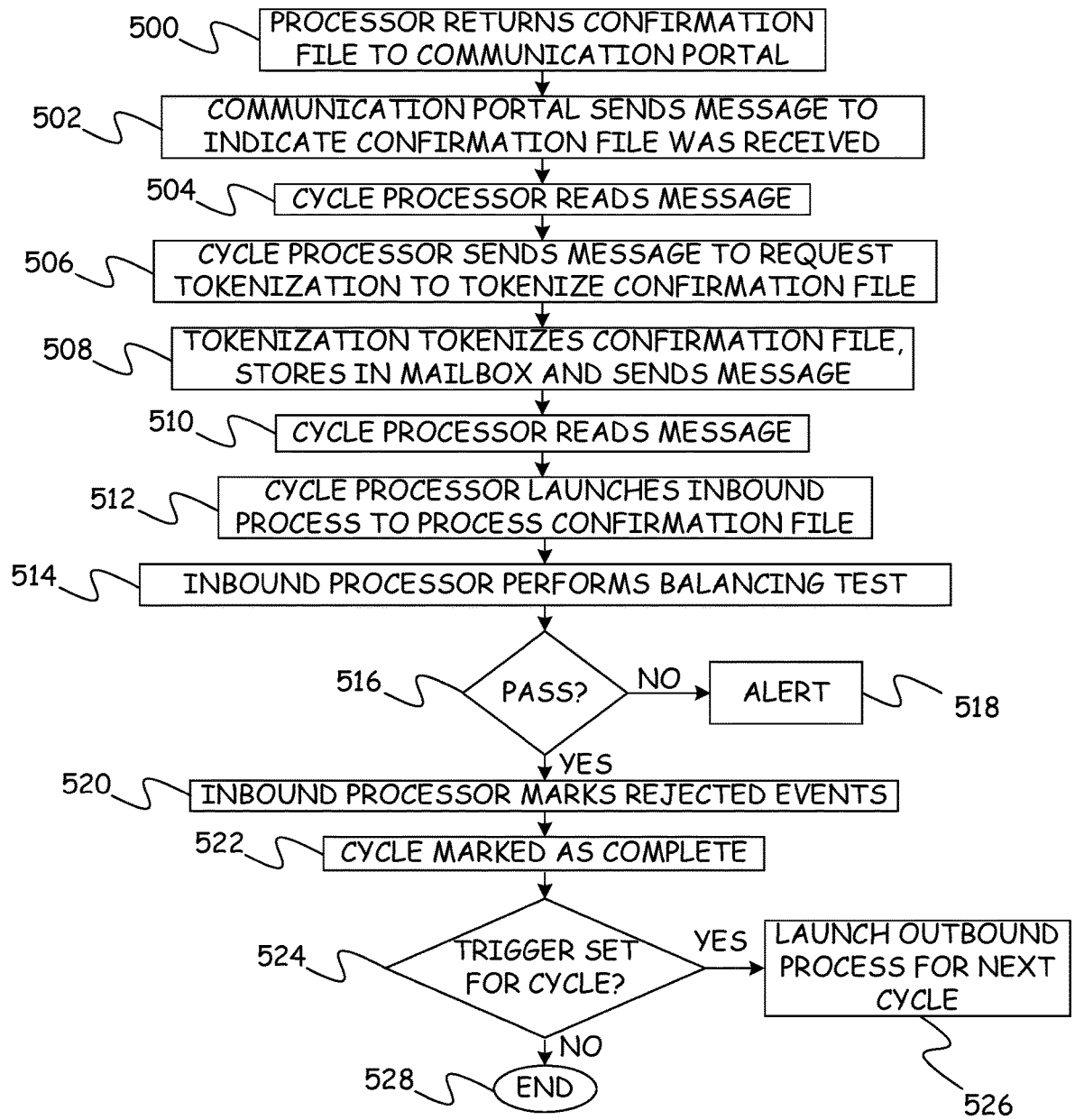
FIG. 5 is a flow diagram of a method of receiving a confirmation file from an external processor.

FIG. 5 provides a flow diagram of a method that is performed when one of external processors 114 returns a confirmation file to communication portal 112. At step 500, one of external processors 114 returns a confirmation file to processor mailbox 151 of communication portal 112. At step 502, communication portal 112 sends a message to message broker 154 indicating receipt of the confirmation file. At step 504, cycle processor 144 retrieves the message in message broker 154 and in response at step 506, cycle processor sends a message to message broker 149 to request that tokenization system 110 tokenize confidential information in the confirmation file.

At step 508, tokenization system 110 retrieves the request from message broker 149, tokenizes the confirmation file, stores the tokenized file in tokenization mailbox 150 and sends a message to message broker 152 that the file has been tokenized.

At step 510, cycle processor 144 reads the message in message broker 152 and at step 512, cycle processor 144 launches an inbound processor 160 to process the confirmation file. At step 514, inbound processor 160 performs balancing on the confirmation file to assess whether the confirmation file includes confirmations for every event sent in the cycle file to the external processor. If the confirmation file does not pass the balancing at step 516, an alert is sent at step 518. If the confirmation file does pass the balancing test at step 516, the inbound processor examines the confirmations for each event and identifies those events that were unable to be processed successfully by the external processor. These events are marked as rejected in database 142 by inbound processor 160 at step 520. When inbound processor 160 has completed its evaluation of the confirmation file, it posts a message to message broker 148, which is read by cycle processor 144 and causes cycle processor 144 to mark the cycle as complete at step 522 and to post a message to message broker 148 that is read by acknowledgement process 156 and causes acknowledgement process 156 to post a rejection message to broker 134 for every event in the cycle that was marked as rejected in database 142.

After they cycle is marked as complete, cycle processor 144 determines if a trigger has been sent for the next cycle after the cycle that was just marked as complete. Such a trigger is set in step 322 of FIG. 3. Such a trigger is set when confirmation that a preceding cycle has been processed has not been received when a current cycle reaches its scheduled transmission time. If at step 524 such a trigger has been set for the next cycle after the cycle that was just marked as completed, cycle processor 144 launches outbound processor 146 for the next cycle at step 526. If a trigger has not been set for the next cycle, the process of FIG. 5 ends at step 528 and the intermediary system 108 waits for the scheduled transmission time of the next cycle.

Figure 6:
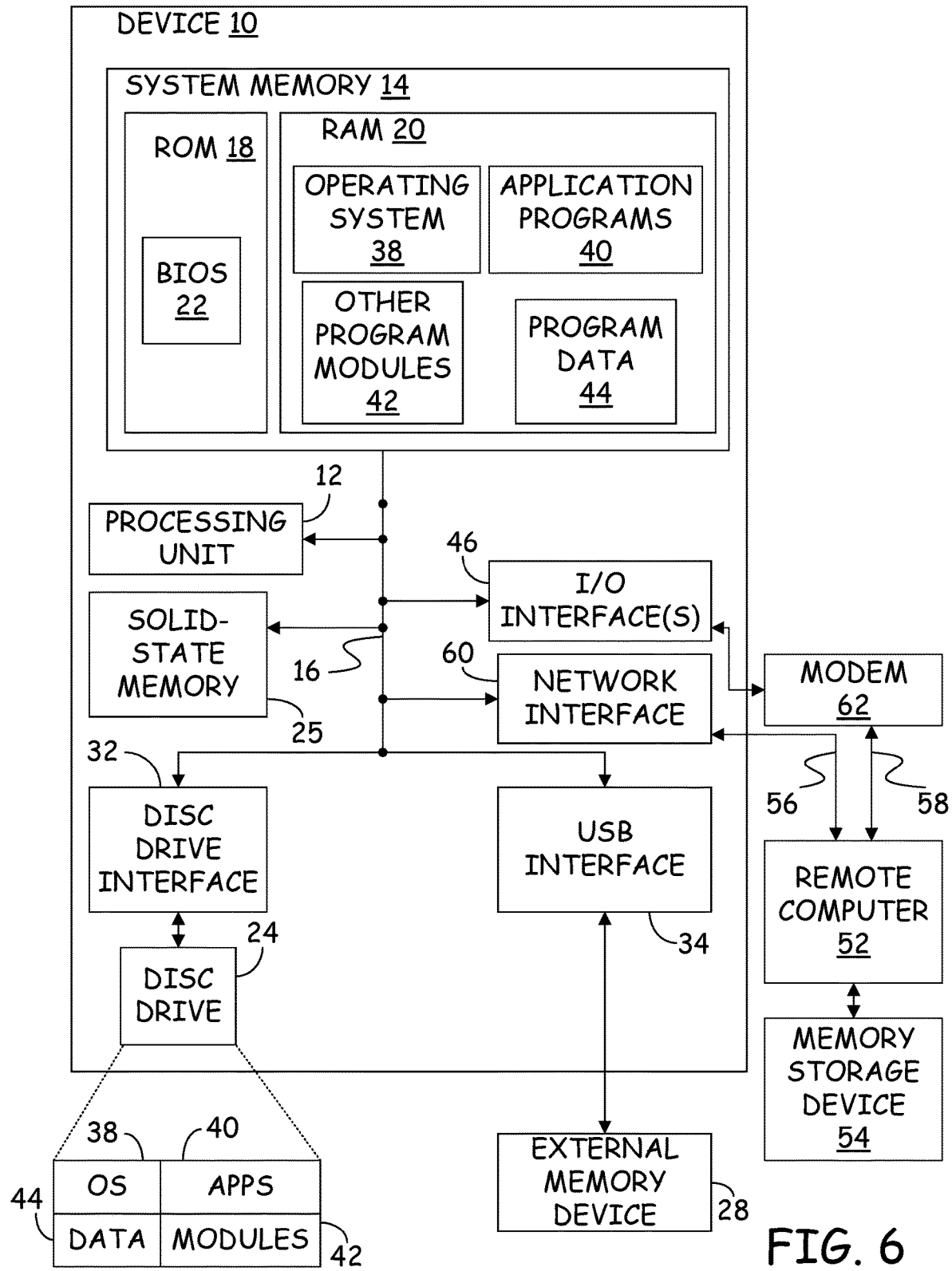
FIG. 6 provides a block diagram of an exemplary computer used to execute the various embodiments.

FIG. 6 provides an example of a computing device 10 that can be used to implement the various parts of system 100. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, and an optional external memory device 28. External memory device 28 can include an external disc drive or solid state memory that may be attached to computing device 10 through an interface such as Universal Serial Bus interface 34, which is connected to system bus 16. Hard disc drive 24 is connected to the system bus 16 by a hard disc drive interface 32. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the systems discussed above. Program data 44 may include any data used by the systems and methods discussed above.

Processing unit 12, also referred to as a processor, executes programs in system memory 14 and solid state memory 25 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 6. The network connections depicted in FIG. 6 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 6 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
    sending a first cycle of received event data to an external system for processing;
    while waiting for the external system to confirm that processing of the first cycle of received event data has been completed, receiving a stream of additional event data for processing and assigning some of the additional event data to a second cycle of received event data, wherein the second cycle has a scheduled transmission time to be sent to the external system for processing; and
    preventing the second cycle of received event data from being sent to the external system when the scheduled transmission time arrives because the external system has not returned confirmation that processing has been completed for the first cycle.

2. The computer-implemented method of claim 1 wherein assigning some of the additional event data to the second cycle comprises assigning event data to the second cycle until the scheduled time arrives.

3. The computer-implemented method of claim 2 further comprising, receiving a stream of further additional event data and assigning the further additional event data to a third cycle of received event data while waiting for the external system to confirm the processing of the first cycle of received event data.

4. The computer-implemented method of claim 3 wherein assigning the further additional event data to the third cycle comprises assigning event data to the third cycle after the scheduled time arrives.

5. The computer-implemented method of claim 4 wherein the third cycle has a scheduled time to be sent to the external system for processing and wherein assigning the further additional event data to the third cycle further comprises assigning event data to the third cycle until the scheduled time to be sent to the external system for processing for the third cycle arrives.

6. The computer-implemented method of claim 5 wherein when the confirmation that processing has been completed for the first cycle is received after the scheduled time for the third cycle to be sent to the external system, the second cycle is sent to the external system for processing and the third cycle is prevented from being sent to the external system because the external system has not returned confirmation that processing has been completed for the second cycle.

7. The computer-implemented method of claim 1 further comprising:
    assigning some of the additional event data to a cycle of received event data for a second external system, wherein the cycle of received event data for the second external system has a scheduled time to be sent to the second external system; and
    allowing the cycle of received event data for the second external system to be sent to the second external system when the scheduled time for the cycle of received event data for the second external system has arrived even though the external system has not returned confirmation that processing has been completed on the first cycle.

8. A method comprising:
    receiving event data;
    assigning the event data to a cycle that has a scheduled time for sending the event data to an external processor for processing;
    receiving further event data after the scheduled time; and
    assigning the further event data to a second cycle for the external processor while preventing the event data assigned to the cycle from being sent to the external processor.

9. The method of claim 8 wherein the event data for the cycle are prevented from being sent to the external processor because the external processor has not confirmed processing of event data in a previous cycle.

10. The method of claim 9 wherein the second cycle has a second scheduled time for sending event data assigned to the second cycle to the external processor.

11. The method of claim 10 further comprising receiving a conformation from the external processor that event data in the previous cycle have been processed and in response sending the event data for the cycle to the external processor while preventing event data assigned to the second cycle from being sent to the external processor.

12. The method of claim 11 wherein the conformation is received after the second schedule time.

13. The method of claim 8 further comprising:
receiving additional event data;
assigning the additional event data to an additional cycle that is associated with a second external processor; and
sending the additional event data assigned to the additional cycle to the second external processor while preventing the event data assigned to the cycle from being sent to the external processor.

* * * * *